United States Patent [19]

Ioka et al.

[11] Patent Number: 4,946,195
[45] Date of Patent: Aug. 7, 1990

[54] STEERING ASSEMBLY SUPPORTING CONSTRUCTION OF A MOTOR VEHICLE

[75] Inventors: Tadashi Ioka; Katsumi Sakane; Toshifumi Suzuki; Kazunari Amatsu; Kaoru Shimada, all of Hiroshima, Japan

[73] Assignee: Mazda Motor Corporation, Hiroshima, Japan

[21] Appl. No.: 319,689

[22] Filed: Mar. 7, 1989

[30] Foreign Application Priority Data

Mar. 8, 1988 [JP] Japan ............................... 63-54001
Mar. 14, 1988 [JP] Japan ............................... 63-60964

[51] Int. Cl.⁵ .................................................. B62D 1/18
[52] U.S. Cl. ..................................... 280/777; 280/779; 74/492
[58] Field of Search ................ 74/492, 493; 280/777, 280/779, 780

[56] References Cited

U.S. PATENT DOCUMENTS

| | | | |
|---|---|---|---|
| 4,362,319 | 12/1982 | Masaki et al. | 280/779 |
| 4,452,096 | 6/1984 | Workman | 280/777 |
| 4,655,475 | 4/1987 | Van Gelderen | 280/777 |
| 4,718,296 | 1/1988 | Hyodo | 280/777 |

FOREIGN PATENT DOCUMENTS 58-111668 7/1983 Japan .
62-117169 7/1987 Japan .

Primary Examiner—Richard A. Bertsch
Attorney, Agent, or Firm—Wenderoth, Lind & Ponack

[57] ABSTRACT

An upper part of a steering column is supported by a first supporting member and a lower part of the steering column is connected releasably to a car body by a second supporting member. Such component state is released by a releasing device which detects a predetermined state of collision upon the occurrence of a collision. This arrangement restricts the extent of rearward movement of a steering wheel and adjusts properly the amount of upward movement of the steering handle, thereby contributing to the improvement of safety.

17 Claims, 12 Drawing Sheets

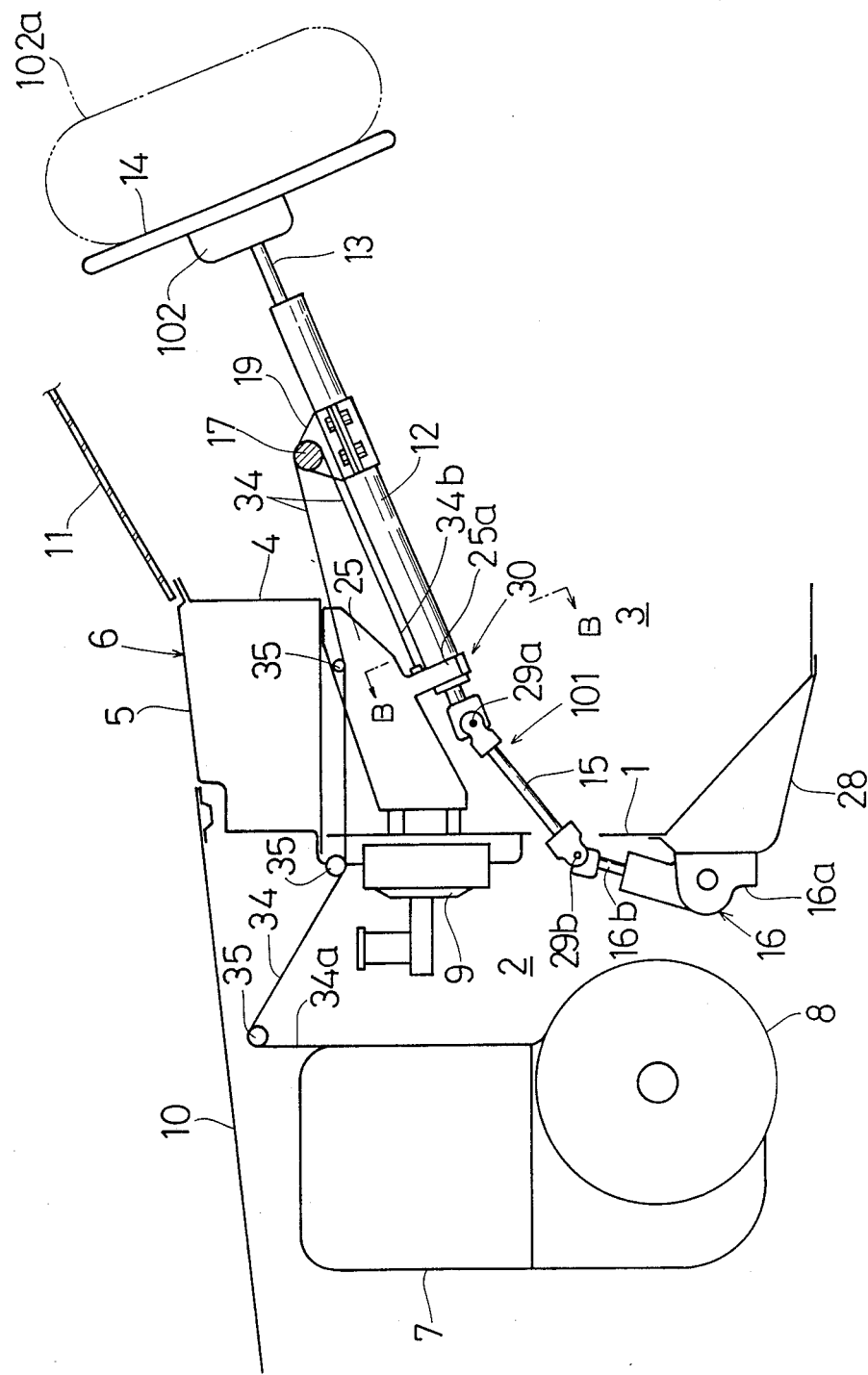

STEERING ASSEMBLY SUPPORTING CONSTRUCTION OF A MOTOR VEHICLE

BACKGROUND OF THE INVENTION

1. Field of the Invention

This invention relates to a steering assembly supporting construction for fitting a steering device of a motor vehicle to a body of the vehicle.

2. Description of a prior art

Generally, in a steering assembly supporting construction of a motor vehicle, a steering shaft which transmits turning force of a steering wheel to a gear box is supported rotatably within a steering column which is arranged in an upwardly inclined orientation, with upper and lower portions of the column fitted to a member on the car body (a dash panel, for example) via a bracket. (Refer to U.S. Pat. No. 4,362,319 and Japanese Utility Model Registration Application Laying Open Gazette No. 58-111668).

Various standards have been established for motor vehicles, one of which provides for the quantity or extent of movement of a steering wheel toward the rear of a driver's compartment upon the occurrence of a collision (hereinafter referred to as "extent of rearward movement of a steering wheel"). The extent of rearward movement of a steering wheel is generally regarded as corresponding to the distance of horizontal movement of a steering wheel toward the rear of a driver's compartment caused by rearward movement of auxiliary machine members, such as an engine, in an engine compartment at the front of a car body toward the driver's compartment upon the occurrence of a head-on collision, for example.

In order to suppress such extent of rearward movement of the steering wheel, it is known to provide a supporting member which connects a lower part of the steering column to a member on the car body in such a fashion that the connected state of the steering column can be released so as to move the steering wheel upwardly, upon the occurrence of a collision, by rotating the steering column around a supporting point whereat the steering column is supported by the car body (refer to Japanese Utility Model Registration Application Laying Open Gazette No. 62-117169).

However, the release of the connected state between the steering column and the supporting member is so composed that release is achieved by movement of the dash panel, which is a portion of the car body, toward the driver's compartment side upon the occurrence of a collision. The movement of the dash panel toward the driver's compartment upon the occurrence of a collision takes place at a relatively later stage of the collision. Therefore, the dash panel will in some cases move only after or as it is deformed in complicated manners. In such cases, the release of the steering column cannot be achieved as desired.

Upon rotation of the steering column, the steering wheel is moved upwardly. However, it is necessary to control the amount of upward movement of the steering wheel to improve safety during collision. In this connection, suppose a driver bumps his head against the steering wheel during the collision. It is desirable in an ordinary motor vehicle to increase the amount of upward movement of the steering wheel due to the rotation of the steering column so that the head of the driver strikes against a ring-shaped part of the steering wheel which is less rigid than a boss or central part of the steering wheel. On the other hand, in a motor vehicle having an airbag device, for example, at the boss or central part of the steering wheel, it is necessary to lessen the amount of upward movement of the steering wheel due to the rotation of the steering column. Control of the amount of upward movement of the steering wheel can be achieved by adjusting the timing of releasing the connected state of the steering column with the supporting member.

SUMMARY OF THE INVENTION

An object of the present invention is to improve safety upon the occurrence of a collision by releasing timely and positively the connected state of the steering column with the supporting member so as to restrict the extent of the rearward movement of the steering wheel and also to control properly the amount of upward movement of the steering wheel.

In order to achieve the above object, the construction according to the present invention comprises a steering column which is arranged in upwardly inclined orientation and which supports rotatably a steering shaft which transmits turning force of the steering wheel to a gear box, a first steering column supporting member which supports an upper part of the steering column to a fixed position, a second steering column supporting member which connects a lower part of the steering column to a member on the car body in such a fashion that the connected state of the steering column is releasable, and a releasing means which detects a predetermined state of collision upon the occurrence of a collision and releases the connected state of the steering column with the second steering column supporting member.

With the above construction, at the time of a collision of the motor vehicle, the releasing means, which detects the predetermined state of collision, releases the connected state of the steering column with the second steering column supporting member which supports the lower part of the steering column. Such release is compulsory and accurate, and the steering column rotates about the first steering column supporting member which supports the upper part of the steering column as a fulcrum. Thus, the extent of rearward movement of the steering wheel can be restricted as much as possible and accurately. Since the timing of releasing the connected state by the releasing means can be adjusted to optional collision states or conditions upon the occurrence of a collision, the amount of upward movement of the steering wheel by the rotation of the steering column can be adjusted properly and safety can be improved.

The above and other objects, features and advantages of the present invention will become more apparent from the following description of preferred embodiments, with reference to the accompanying drawings.

BRIEF DESCRIPTION OF THE DRAWINGS

The accompanying drawings show preferred embodiments of the present invention, in which:

FIG. 1 to FIG. 6 show a first embodiment of the present invention, of which FIG. 1 is a rough cross section, showing a steering assembly supporting construction of a motor vehicle; FIG. 2 is a perspective view of the construction shown in FIG. 1; FIG. 3 is a view thereof as seen from the rear of the driver's compartment; FIG. 4 and FIG. 5 are side views in longitudinal section, showing the composition of a second steering column supporting member, of which FIG. 4 shows a connected state of a steering column and FIG. 5 shows a released state of the steering column; FIG. 6 is a cross section, taken along the line A—A in FIG. 4;

FIG. 7 to FIG. 11 show a second embodiment of the present invention, in which FIG. 7 corresponds to FIG. 1; FIG. 8 corresponds to FIG. 3; FIG. 9 is a cross section, on an enlarged scale, taken along the line B—B in FIG. 7; and FIG. 10 and FIG. 11 are cross sections taken along the line C—C and the line D—D, respectively, in FIG. 9;

FIG. 13 corresponds to FIG. 3; FIG. 14 is a cross section, taken along the line E—E in FIG. 12; and FIG. 15 is a perspective view of the portion marked in FIG. 14; FIG. 17 corresponds to FIG. 3; FIG. 18 is a cross section, on an enlarged scale, taken along the line G—G in FIG. 16; FIG. 19 and FIG. 20 are cross sections taken along the line H—H and the line I—I, respectively, in FIG. 18; and FIG. 21 is a view in the direction of arrow J in FIG. 18.

DESCRIPTION OF PREFERRED EMBODIMENTS

Descriptions are made below of the preferred embodiments of the present invention with reference to the attached drawings.

Figure 1:
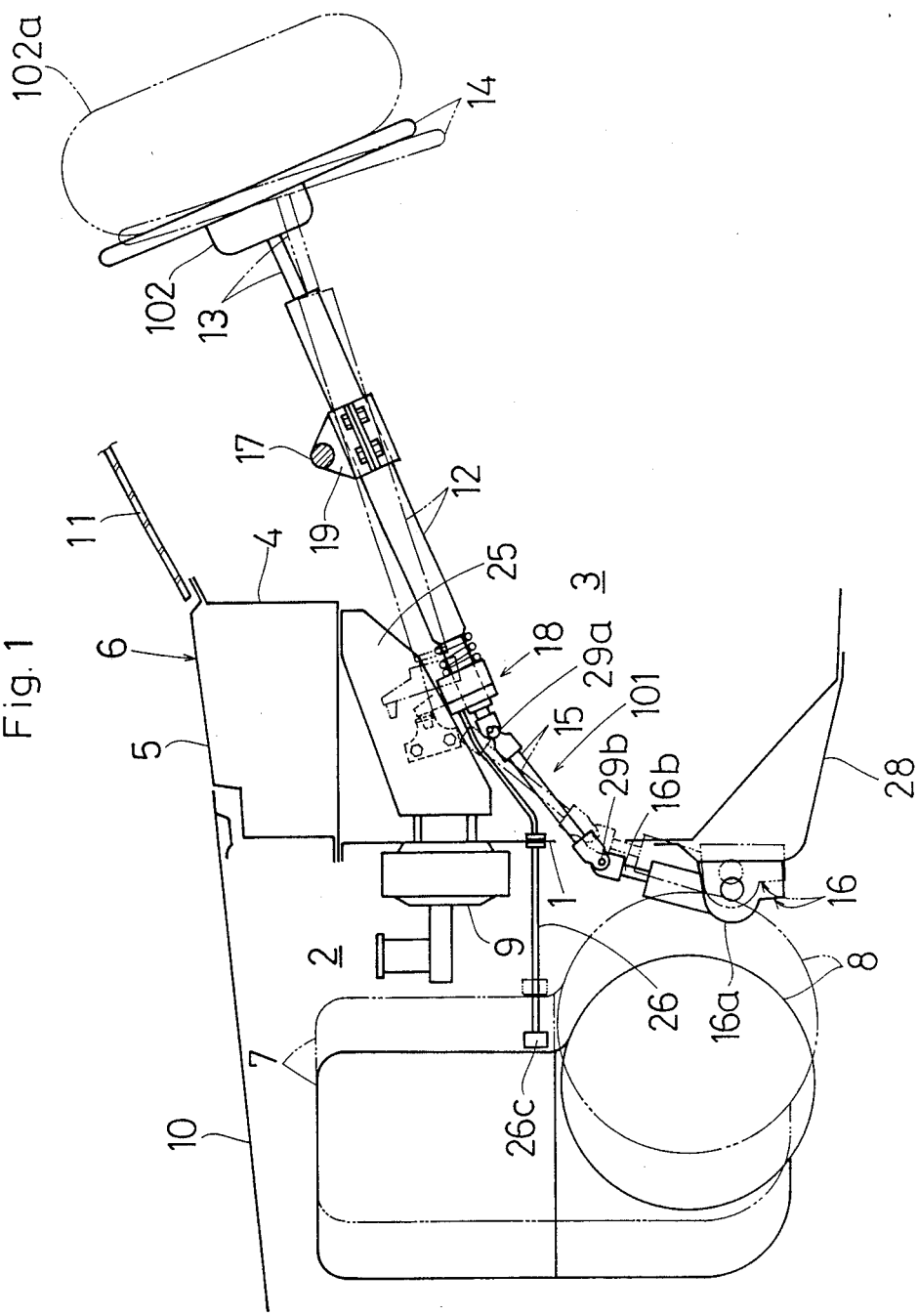
Figure 2:
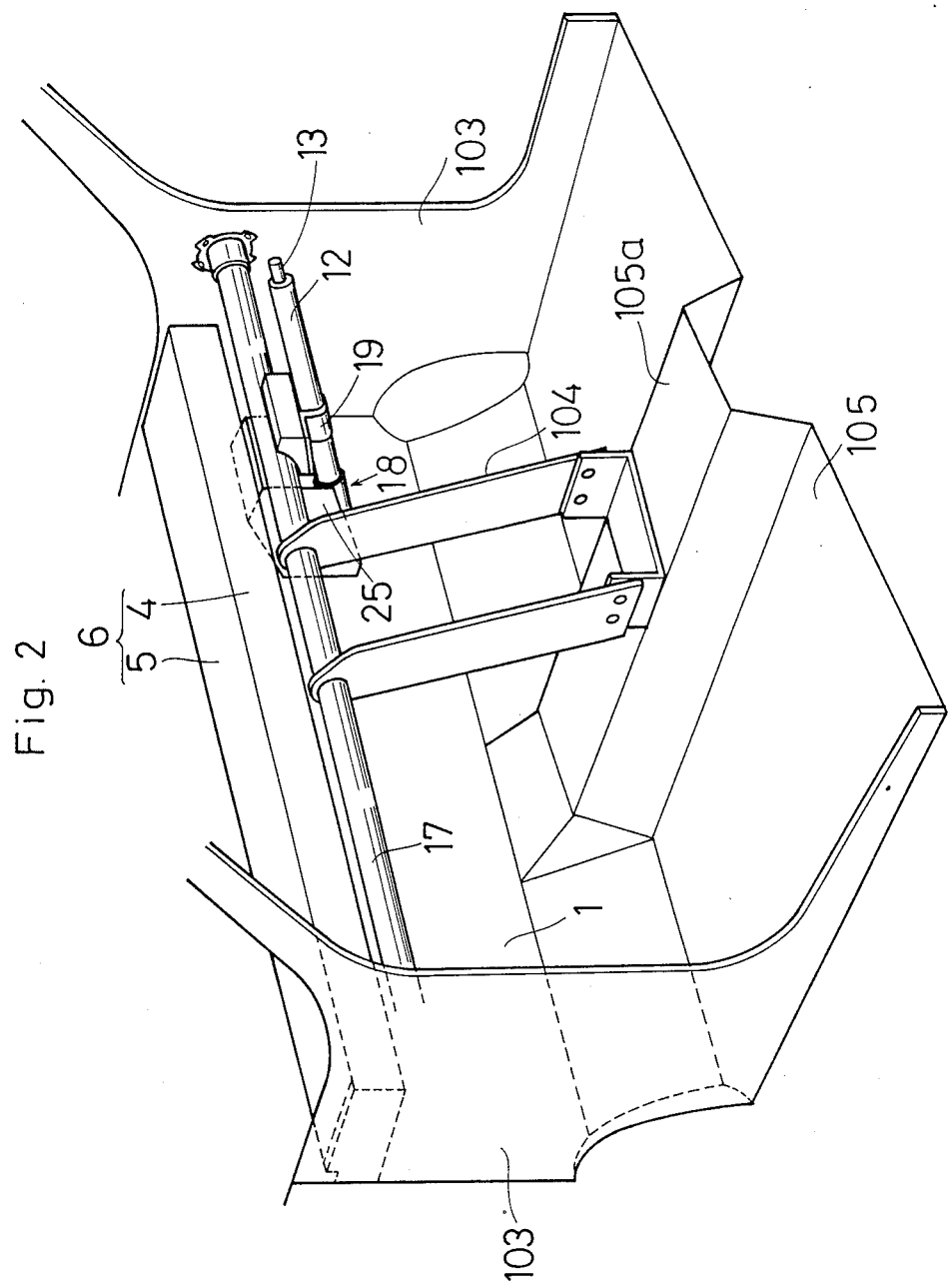
Figure 3:
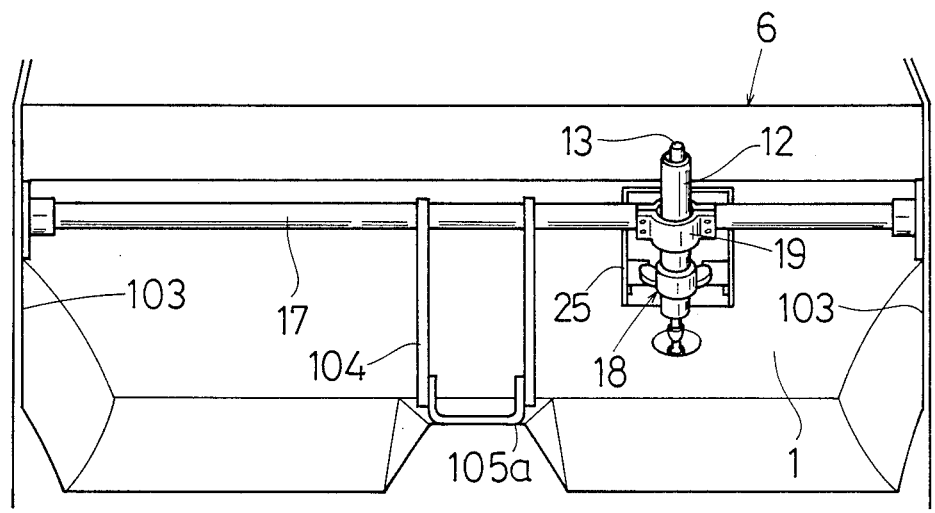

FIG. 1 to FIG. 3 show a steering assembly supporting construction of a motor vehicle according to a first embodiment of the present invention. Reference numeral 1 designates a lower dash panel which partitions an engine compartment 2 from a driver's compartment 3. Reference numeral 4 designates an upper dash panel connected to the upper end of the lower dash panel 1. The upper dash panel 4 composes, together with a cowl panel 5 arranged thereabove, a cowl box 6 of closed cross sectional construction which extends in the direction of the car width. Reference numerals 7 and 8 designate respectively an engine and a transmission arranged in the engine compartment 2. Reference numeral 9 designates a vacuum multiplying device for multiplying the brake pedal treadling force and is fixed to the upper part of the lower dash panel 1. Reference numeral 10 designates a bonnet which opens and shuts the upper part of the engine compartment 2. Reference numeral 11 designates a front window glass or windshield. Reference numeral 12 designates a steering column arranged in an upward inclination in the front portion of the driver's compartment 3. A main steering shaft 13 extends through the steering column 12 and is rotatable relative thereto. While a steering wheel 14 is fitted to the upper end of the main steering shaft 13, a gear box unit 16 is connected to the lower end of the main steering shaft 13 via a connecting shaft 15. The gear box unit 16 carries a gear box proper 16a which is fitted to a reinforcement 28 connected to the lower part of the lower dash panel 1 in such a position that it confronts the engine compartment 2 and a pinion rod 16b extending upwardly from the gear box 16a. Connected to an upper end of the pinion rod 16b is the connecting shaft 15 and provided at the lower end of the pinion rod 16b is a pinion gear (not shown in the drawings) which engages with a rack which is arranged in the gear box 16a to extend in the direction of the width of the car. The connecting shaft 15 is arranged in such a fashion that it inclines more frontwardly and more downwardly than the main steering shaft 13 and passes through the lower dash panel 1. A joint between the main steering shaft 13 and the connecting shaft 15 and a joint between the connecting shaft 15 and the pinion rod 16b of the gear box unit 16 are formed by a universal joint 29a and a universal joint 29b respectively. The turning force of the steering wheel 14 is transmitted to the gear box unit 16 via a steering shaft 101 comprising the main steering shaft 13 and the connecting shaft 101 comprising the main steering shaft 13 and the connecting shaft 15 and is further transmitted to the right and left front wheels via tie rods or the like (not shown in the drawings), whereby both front wheels are steered right and left. An airbag device 102, for preventing the driver from bumping his head directly against the steering wheel 14 upon the occurrence of a collision, is provided at a boss or central portion of the steering wheel 14 (i.e. at the area of connection thereof to the main steering shaft 13).

The steering column 12 is supported at two positions (upper and lower positions) to the car body side via a first steering column supporting member 17 and a second steering column supporting member 18 respectively. Of these two supporting members 17, 18, the first steering column supporting member 17 supporting the upper part of the steering column comprises a rod-like member extending in the direction of the car width, with its right and left ends connected to cowl sides 103 and its central part supported by a tunnel portion 105a of a car body floor 105. The steering column 12 is supported in a suspended manner from the steering column supporting member 17 via a bracket 19.

Figure 6:
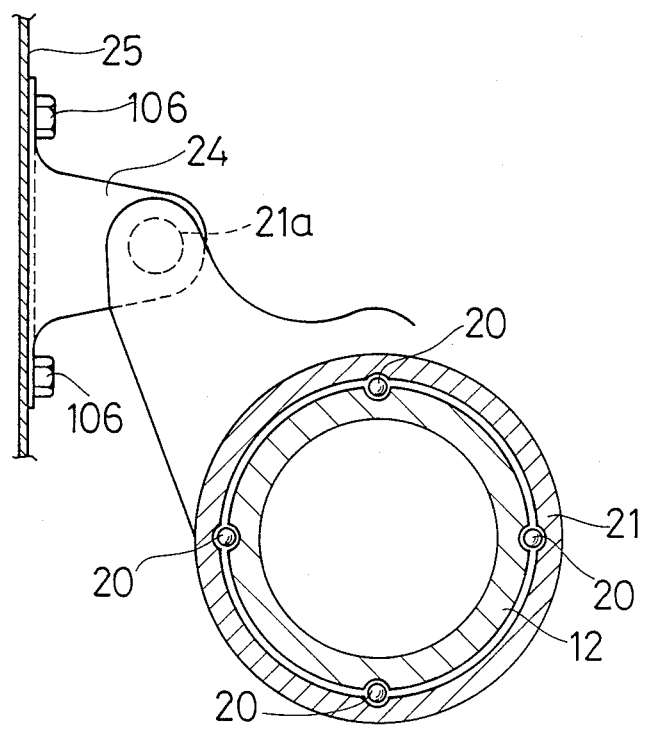
Figure 4:
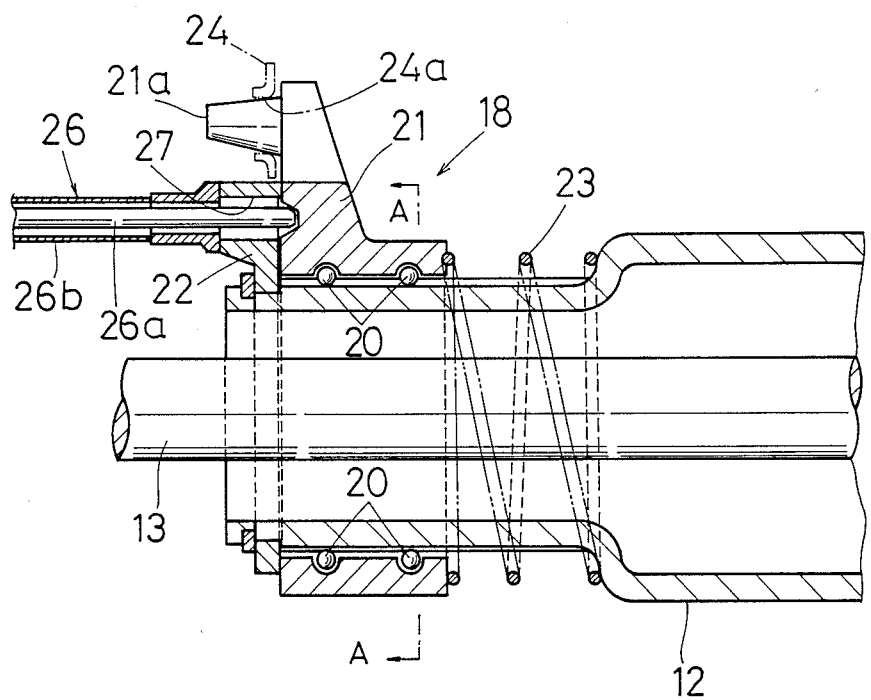
Figure 5:
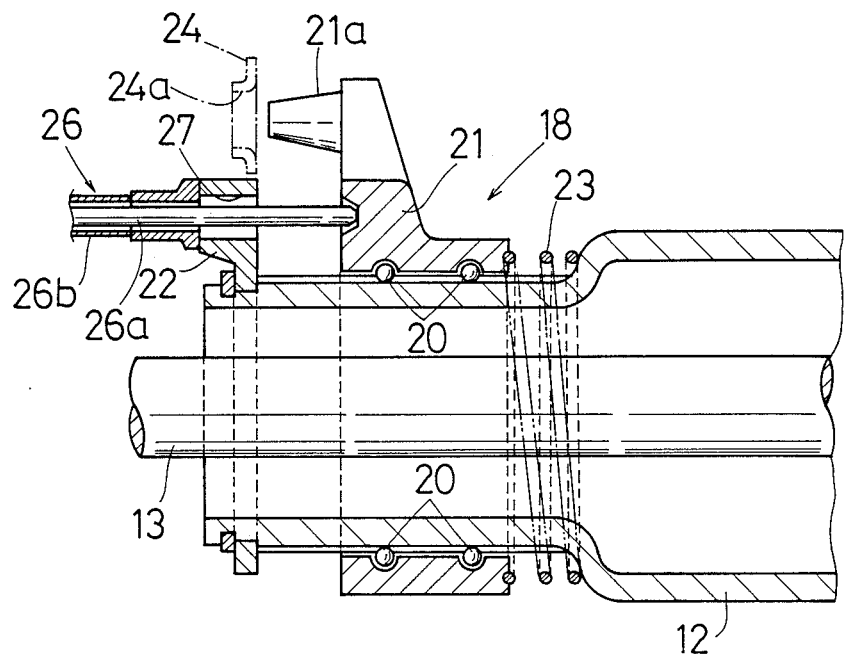
Figure 8:
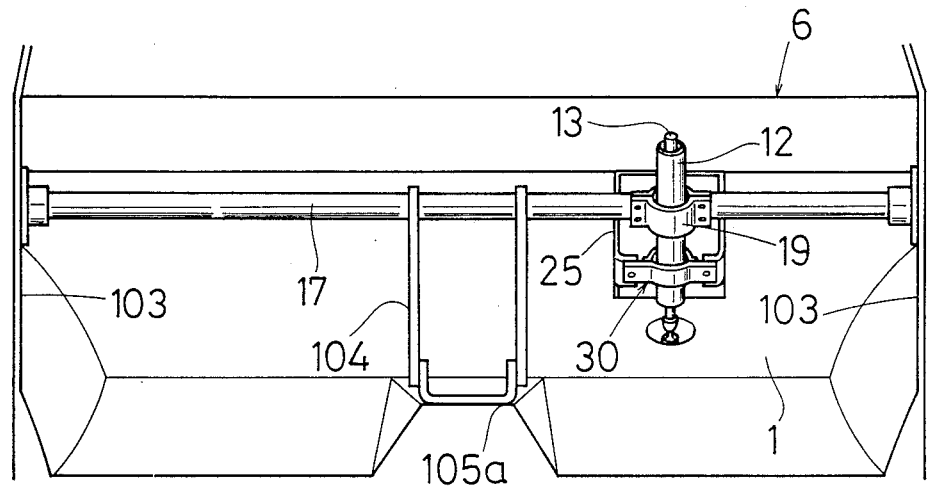
Figure 9:
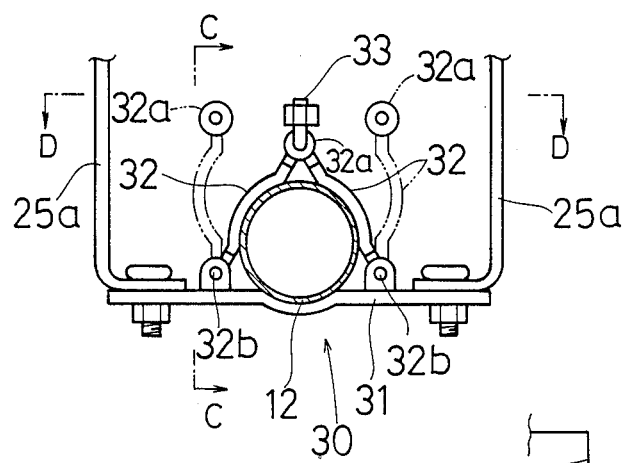
Figure 10:
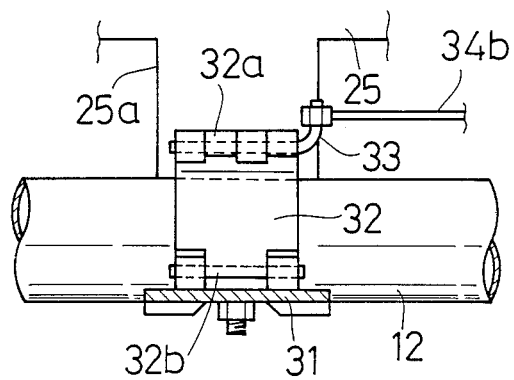
Figure 11:
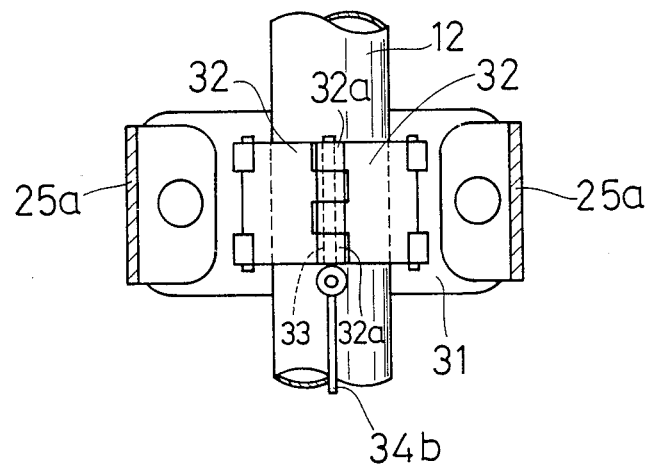
Figure 12:
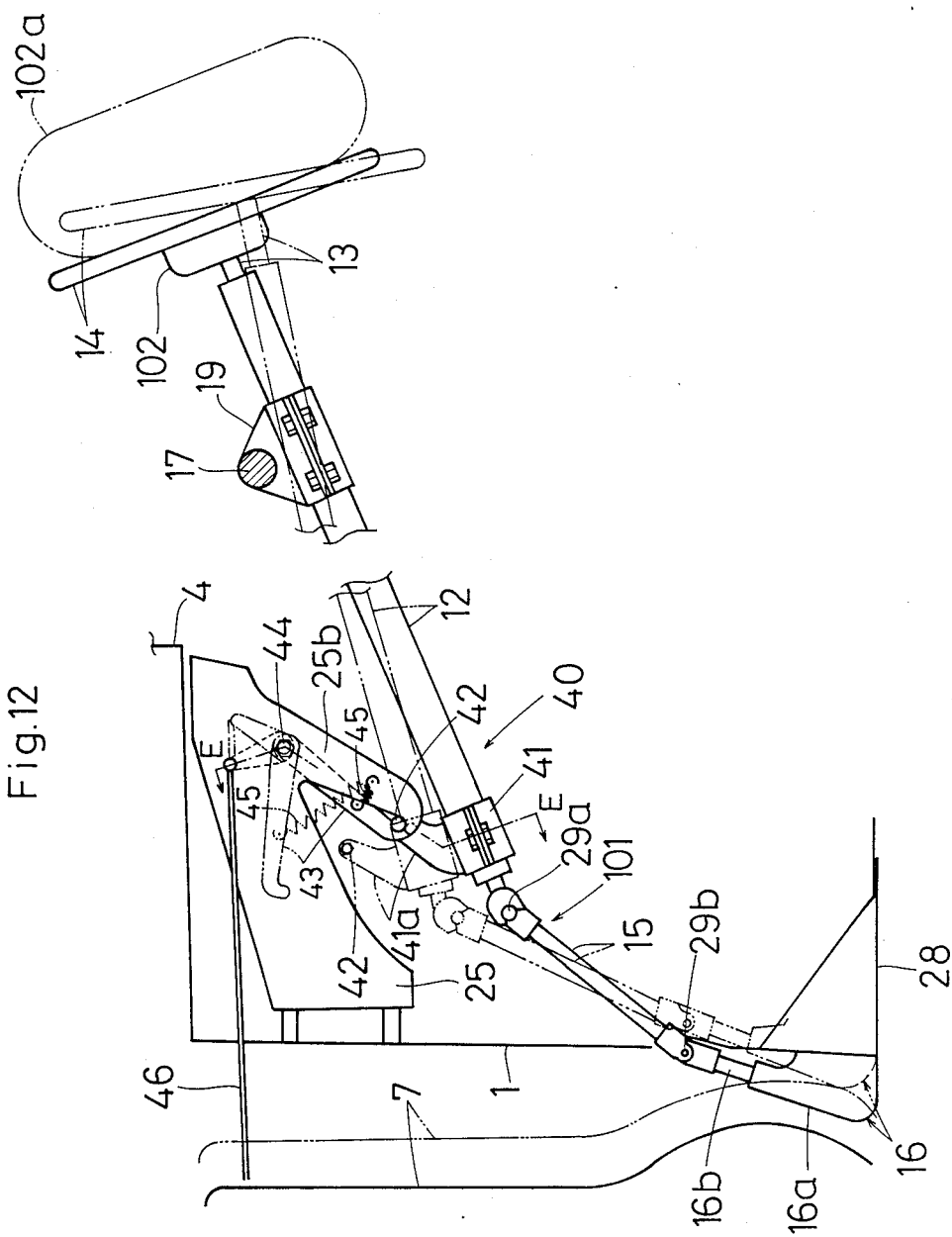
FIG. 12 to FIG. 15 show a third embodiment of the present invention, in which FIG. 12 corresponds to FIG. 1.
Figure 13:
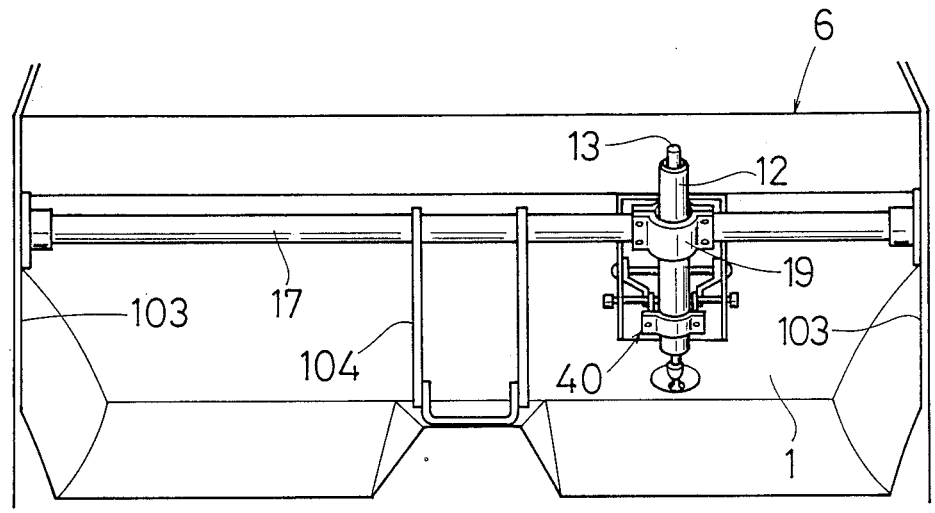
Figure 14:
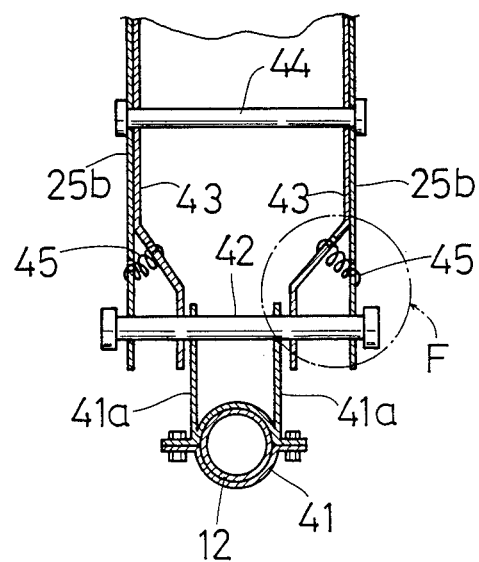
Figure 15:
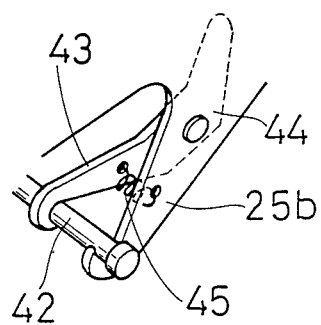
Figure 16:
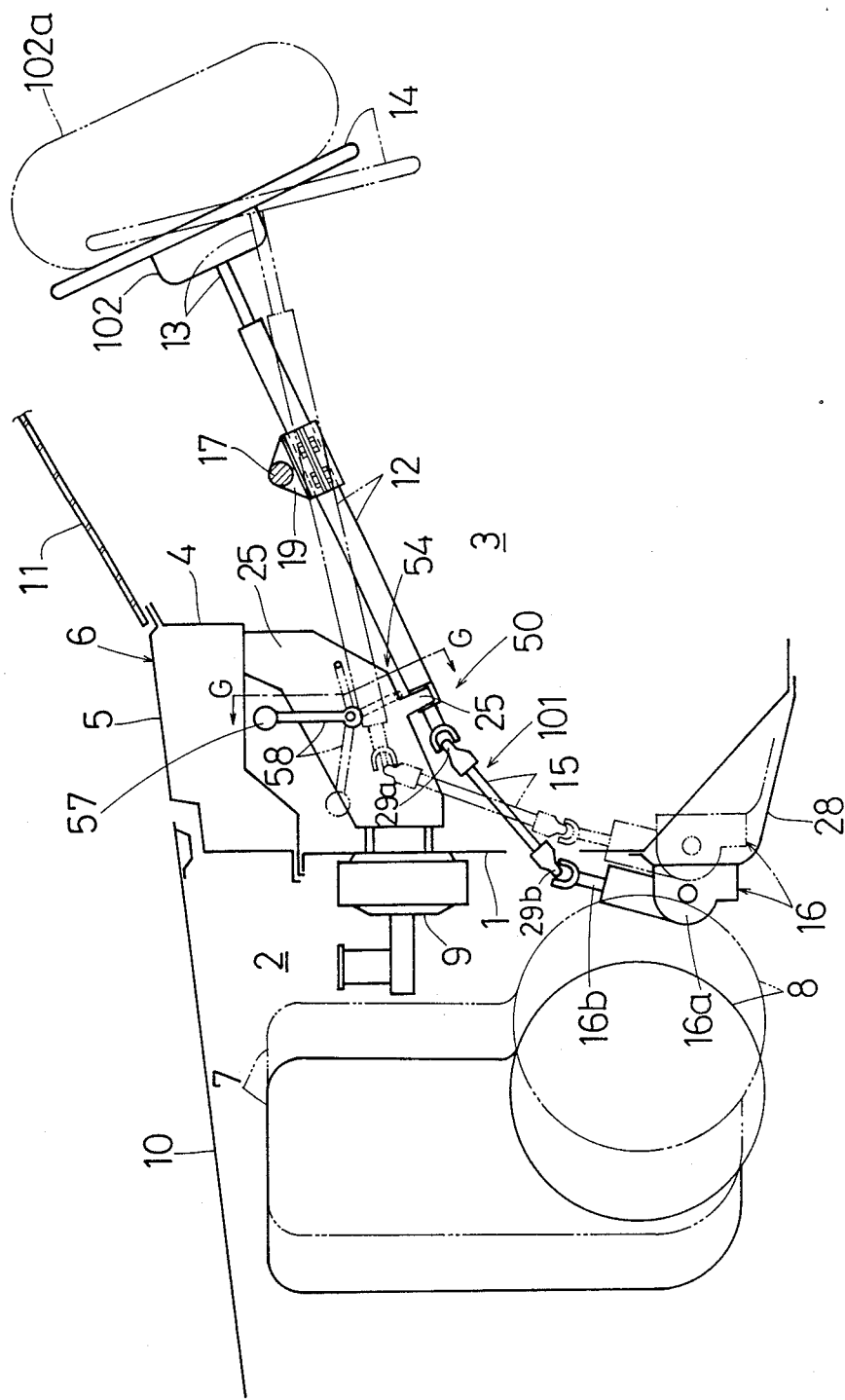
FIG. 16 to FIG. 21 show a fourth embodiment of the present invention, in which FIG. 16 corresponds to FIG. 1.
Figure 17:
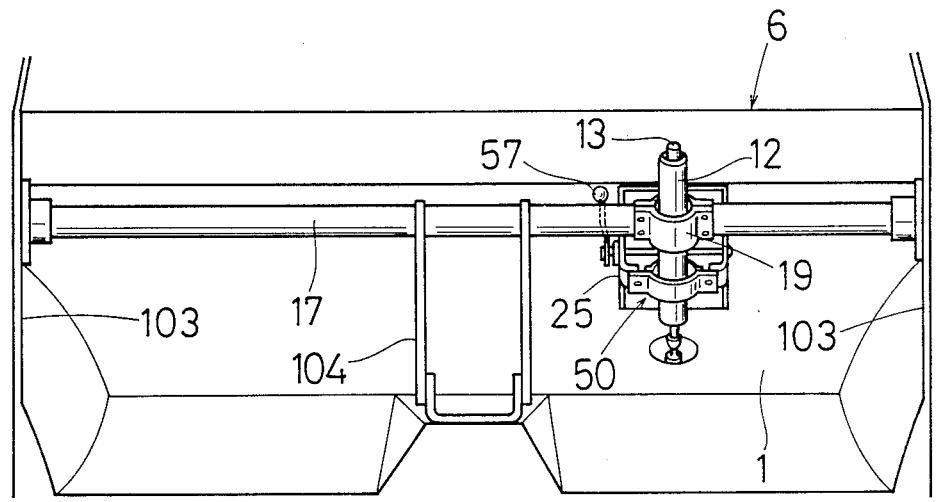
Figure 19:
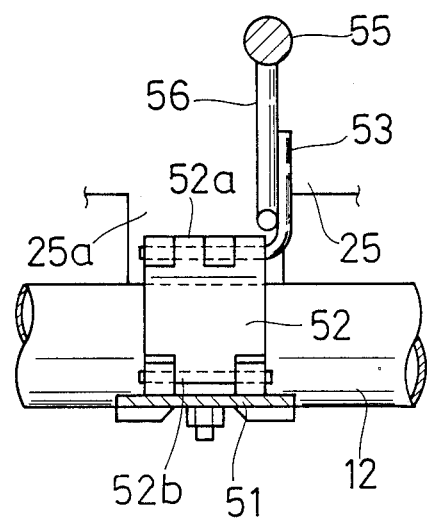
Figure 21:
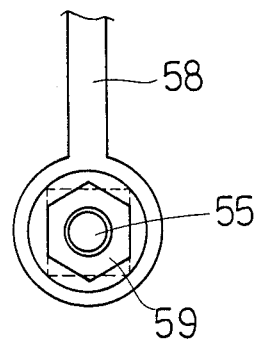
Figure 18:
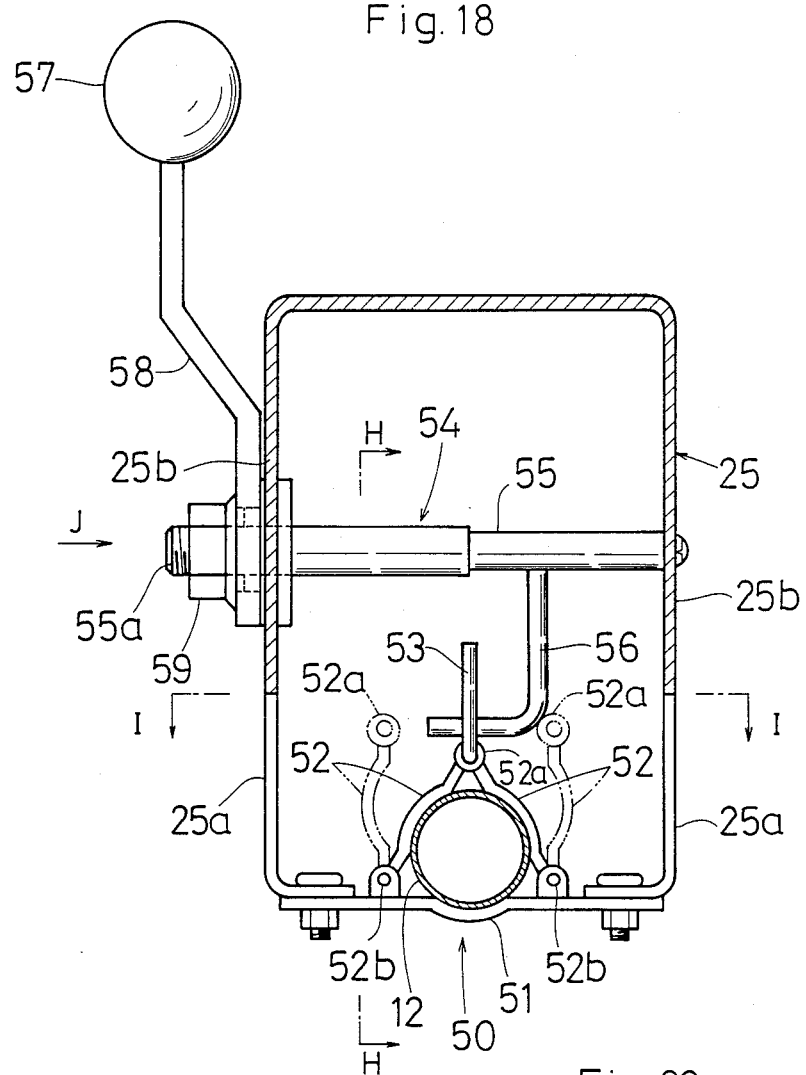
Figure 20:
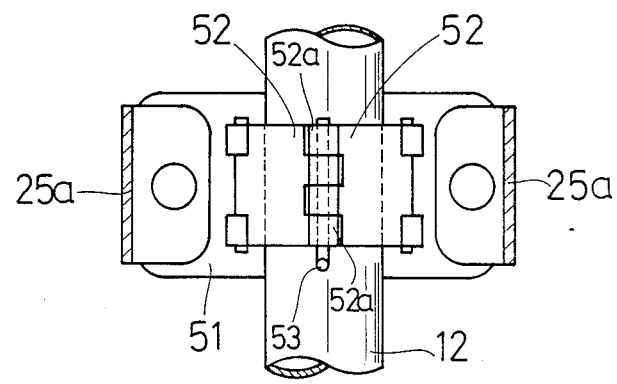

On the other hand, as shown in FIG. 4–FIG. 6 the second steering column supporting member 18 which supports the lower part of the steering column 12 is provided with a sliding member 21 mounted slidably in the axial direction on an outer circumference of the steering column 12 through the medium of rollers 20, a stopper member 22 which limits sliding of the sliding member 21 relative to steering column in the forward axial direction, a spring 23 which urges the sliding member 21 forwardly to maintain it in contact with the stopper member 22, and a holding member 24 having a holding hole 24a in which an engaging portion 21a of sliding member 21 is fitted. The holding member 24 is fastened by bolts 106 to a pedal bracket 25 for supporting pedals, such as a brake pedal. The pedal bracket 25 is fixed to the lower dash panel 1 and the upper dash panel 4 of the cowl box 6. By fitting the engaging portion 21a of the sliding member 21 in the holding hole 24a of the holding member 24, the second steering column supporting member 18 connects the steering column 12 to the pedal bracket 25 which is a member on or a part of the car body. By releasing the engaging portion 21a from fitting in the holding hole 24a, such connected state of the steering column 12 is released.

In FIG. 1, reference numeral 26 designates a link member which is a releasing means for releasing the connected state of the steering column 12 in the steering column supporting member 18. The link member 26 comprising a tube 26b and a core rod 26a (refer to FIG. 4 and FIG. 5) is arranged in the longitudinal direction of the car body and passes through the lower dash panel 1. A front end of the link member 26 is positioned close to the rear side of the engine 7 and has a contact portion 26c. On the other hand, as shown in FIG. 4 and FIG. 5, a rear end of the link member 26 is connected at the stopper member 22 of the second steering column supporting member 18 and its core rod 26a extends through a hole 27 in the stopper member 22 and contacts sliding member 21. When the engine 7 moves toward the driver's compartment 3 upon the occurrence of a collision of the car, the contact portion 26c at the extreme front end of the link member 26 contacts the engine 7 and the link member 26 moves rearwardly, whereby the condition of collision is detected. With the rearward movement of the link member 26, the core rod 26a slides the sliding member 21 of the second steering column supporting member 18 in the rearward axial direction of the steering column 12 against the pushing force of the spring 23, whereby fitting of the engaging portion 21a of the sliding member 21 in the holding hole 24a of the holding member 24 is released and in turn the connected state of the steering column 12 is released. The release of the connected state of the steering column 12 by the link member 26 occurs instantly upon the condition of collision prior to the engine 7 and a transmission 8 striking against vacuum multiplying device 9 or the gear box unit 16 on the side of the lower dash panel 1, such timing being achieved in view of the provision of the airbag device 102 as the steering wheel 14. Thus, such release is achieved before the impact of the collision is transmitted to the steering column 12.

An explanation is made below of the action and effect of the above embodiment.

Upon a head-on collision, for example, when the engine 7 and the transmission 8 move toward the driver's compartment 3, prior to the engine 7 and the transmission 8 striking against the vacuum multiplying device 9 or the gear box unit 16 on the lower dash panel 1 side, the link member 26 moves rearwardly due to the contacting part 26c contacting the engine 7 upon initial movement of the engine 7. With such movement of the link member 26, its core rod 26a slides the sliding member 21 of the second steering column supporting member 18 rearwardly in the axial direction of the steering column 12 against the pushing force of the spring 23 and fitting of the engaging portion 21a of the sliding member 21 in the holding hole 24a of the holding member 24 is released, thus releasing the connected state of the steering column 12 and the pedal bracket 25 by the second steering column supporting member 18. Thus, the steering column 12 is put in a one-point supported condition, namely, it is supported at its upper part only by the first steering column supporting member 17. At this stage, since the pedal bracket 25 has not yet been deformed by the collision, release of the above connected state can be carried out accurately.

When the engine 7 and the transmission 8 move toward the driver's compartment 3 as far as the position shown by dashed lines in FIG. 1, the transmission 8 which is at the rear of the engine 7 first strikes against the gear box unit 16 and the impact is transmitted from the gear box unit 16 to the main steering shaft 13 via the connecting shaft 15. At this time, since the connecting shaft 15 slopes downwardly from the main steering shaft 13, the impact transmitted from the connecting shaft 15 causes a moment to act on the main steering shaft 13 and the steering column 12 (in the clockwise direction as viewed in FIG. 1) around the first steering column supporting member 17, whereby the steering wheel 14 moves downwardly. At this time, airbag device 102 senses the impact transmitted to the main steering shaft 13 and airbag 102a inflates automatically as shown by dashed lines in FIG. 1.

When the engine 7 and the transmission 8 move further toward the driver's compartment 3, the engine 7 strikes against the vacuum multiplying device 9 and such impact acts from the vacuum multiplying device 9 on the pedal bracket 25, via the lower dash panel 1, as a backward impact load. At this time, the pedal bracket 25 moves horizontally toward the rear of the driver's compartment 3 due to such backward impact load, but since the steering column 12 is already released from connection with the pedal bracket 25 by the second steering column supporting member 18, the steering column 12 rotates (in the counterclockwise direction as viewed in FIG. 1) with the first steering column supporting member 17 as a center, whereby the steering wheel 14 moves upwardly. Thus, the quantity of rearward movement of the steering wheel 14 can be reduced as much as possible.

Upon a collision as indicated above, the driver will tend to bump his head against the steering wheel. In order to prevent such danger, in this embodiment the airbag device 102 is provided at the central or boss portion of the steering wheel 14. Also in this embodiment, when the steering wheel 14 receives the impact from the gear box unit 16 it moves downwardly, but then it moves upwardly when it receives the impact from the vacuum doubling device 9. Therefore, when a driver bumps his head against the inflated airbag 102a of the airbag device 102 on the steering wheel 14, the steering wheel 14 is in almost the same position as before the collision. Thus, the position at which a driver will bump his head against the airbag 102a on the steering wheel 14 is the central part of the airbag 102a corresponding to the central part of the steering wheel 14. This will utilize the preventive effect of the airbag 102a more effectively.

FIG. 7–FIG. 11 show a steering assembly supporting construction according to the second embodiment of the present invention. In the case of this second embodiment, a second steering column supporting member 30 which connects the lower part of the steering column 12 to the pedal bracket 25 is provided with a support plate 31 which is mounted between a pair of right and left arms 25a formed at the pedal bracket 25 and supports the steering column 12 from the underside thereof. A pair of clamp members 32 have first ends 32b thereof fixed to the support plate 31 by hinges. A connecting pin 33 is passed through second ends or hinge portions 32a of both clamp members 32, thereby clamping steering column 12 to support plate 31. By releasing the connected state of clamp members 32 by removing the connecting pin 33, connection of the steering column 12 with the pedal bracket 25 is released.

A releasing means for releasing the steering column 12 from the connected state by removing the connecting pin 33 includes a wire 34 extending in the engine compartment 2 and the driver's compartment 3 and supported by rollers 35. One end portion 34a of the wire 34 in the engine compartment is connected to the upper part of the engine 7 and the other end portion 34b in the driver's compartment is connected to the connecting pin 33 of the second steering column supporting member 30 from the side of the first steering column supporting member 17, namely, from the rear. Upon the occurrence of a collision of the car, prior to the engine 7 and the transmission 8 striking against the vacuum multiplying device 9 or the gear box unit 16 on the lower dash panel 1, the wire 34 detects such collision by a pulling force caused by movement of the engine 7 toward the driver's compartment 3, and the steering column 12 is released from the connected state by removal of the connecting pin 33 of the second steering column supporting member 30. Other features of the steering assembly supporting construction are the same as in the case of the first embodiment. Like reference numerals are given to like members and explanation thereof is omitted.

FIG. 12–FIG. 15 show a steering assembly supporting construction according to the third embodiment of the present invention. In the case of this embodiment, a second steering column supporting member 40 which connects the lower part of the steering column 12 to the pedal bracket 25 is provided with a bracket 41 fitted to the steering column 12. A connecting rod 42 is mounted between a pair of right and left arm portions 41a of bracket 41 that project toward the pedal bracket 25 and extends in the car width direction orthogonal to the axial direction of the steering column 12. A pair of receiving members 25b support the connecting rod 42 from the lower side thereof and are formed integrally with the pedal bracket 25. A restricting member 43 restricts or urges the connecting rod 42, supported on the receiving members 25b, from the upper side thereof and is pivoted to the pedal bracket 25 about a support axis 44. The restricting member 43 is biased to urge the connecting rod against the receiving members 25b at all times by a spring 45.

Connected to the restricting member 43 is one end of a link member 46 that forms a releasing means. The other end of the link member 46 extends nearly to the rear side of the engine 7 and passes through the lower dash panel 1. Upon the occurrence of a collision of the car, before the engine 7 and the transmission 8 strike against the vacuum multiplying device 9 or the gear box unit 16 on the lower dash panel 1, the link member 46 detects such collision by rearward movement of the engine 7 toward the driver's compartment 3. The restricted condition of connected rod 42 on the receiving members 25b of the pedal bracket 25 is released by rotating the restricting member 46 about axis 44 in a restriction releasing direction (in the clockwise direction in FIG. 12) against the force of spring 45, and thus the steering column 12 is released from connection with the pedal bracket 25.

FIG. 16–FIG. 21 show a steering assembly supporting construction according to the fourth embodiment of the present invention. In the case of this embodiment, a second steering column supporting member 50 which connects the lower part of the steering column 12 to the pedal bracket 25 is provided, similarly to the second embodiment, with a support plate 51 which is mounted between arm portions 25a of the pedal bracket 25 and supports the steering column 12 from the underside thereof, a pair of clamp members 52 having first ends 52b thereof fixed to the support plate 51 by hinges, and a connecting pin 53 for connecting hinge portions 52a at the other ends of clamp members 52, thereby clamping the steering column 12 to support plate 51.

A releasing means 54 includes a support axle or axis 55 which is mounted and supported between right and left walls 25b of the pedal bracket 25 and an engaging rod 56 which projects from the support axis 55 and engages with the connecting pin 53 of the second steering column supporting member 50. Connected to one end of the support axis 55 via a lever member 58 is a globular weight member 57 which rotates integrally with the support axis 55. A binding nut 59 for controlling the rotation of the support axis 55 is screwed onto a threaded portion 55a of the support axis 55 by a required binding force. Upon the occurrence of a collision of the car, the eight member 57 and the support axis 55 turn about the axis of the latter by the force of inertia acting on the weight member 57 against the binding force of the binding nut 59, whereby the engaging rod 56 is rotated and the pin 53 of the second steering column supporting member 50 is removed from ends 52a of clamp members 52. Thus, the connected state of the steering column 12 is released.

In any of the second, third and fourth embodiments, upon the occurrence of a collision of the car, before the engine 7 and the transmission 8 strike against the vacuum multiplying device 9 or the gear box unit 16, the connected state of the steering column 12 with the respective second steering column supporting member 30, 40, 50 is released accurately by the respective releasing means 34, 46, 54. The steering column 12 then is rotated, with the first steering column supporting member 17 as a center, first by the impact of transmission 8 against the gear unit box 16 causing the steering wheel 14 to move downwardly, and then soon thereafter by the impact of the engine against the vacuum multiplying device 9 causing steering wheel 14 to move upwardly. This will restrict as much as possible the extent of rearward movement of the steering wheel 14 and also will maximize protection of the driver from bumping his head against the steering wheel 14.

The present invention is not limited to the first, second, third and fourth embodiments mentioned above but includes other various modifications. For example, in each of the above embodiments the present invention is applied to a steering assembly supporting construction of a motor vehicle provided with the airbag device 102 at the steering wheel 14, but also is applicable to a steering assembly supporting construction of a motor vehicle not having airbag device 102. In such case, in the event that a driver will bump his head against the steering wheel 14 due to the reaction of the collision, it is preferable that the arrangement be such that the driver strike his head against a circumferential edge of low rigidity of the steering wheel than a central boss portion of high rigidity. Therefore, in the case of the first embodiment, the timing at which the connected state of the steering column 12 with the second steering column supporting member 18 is released is set at the collision state immediately before the engine 7 strikes against the vacuum multiplying device 9 after the transmission 8 strikes against the gear box 16 so that the steering wheel 14 moves only upwardly due to the rotation of the steering column 12.

In each of the above embodiments, the second steering column supporting members 18, 30, 40, 50, each of which connects the lower part of the steering column 12 to the car body side member (pedal bracket 25) and enables such connection releasable, and the releasing means 26, 34, 46, 54, each of which releases the connected state of the steering column by the steering column supporting members 18, 30, 40, 50, are composed mechanically but may be composed electrically. For example, the steering column may be connected to the car body side members by means of an electromagnet, the occurrence of a collision may be detected by a sensor, such as a stain gauge, and a signal from such sensor may interrupt an electric charge to the electromagnet, thereby to release the connected state of the steering column.

What is claimed is:

1. A steering assembly supporting construction for a motor vehicle, said construction comprising:
a steering column to be arranged in an upwardly inclined orientation and supporting rotatably a steering shaft for transmitting turning force of a steering wheel to a gear box unit;
a first steering column supporting member to be fixed to a body of the vehicle and supporting an upper part of said steering column at a fixed position;
a second steering column supporting member for releasably connecting a lower part of said steering column to a member on the body side; and
releasing means for detecting a predetermined state of collision upon the occurrence of a collision of the vehicle and for releasing the connected state of said steering column by said second steering column supporting member before the impact of the collision is transmitted to said steering column.

2. A steering assembly supporting construction as claimed in claim 1, wherein said means detects said state of collision by movement of an auxiliary member of the vehicle arranged in an engine compartment thereof.

3. A steering assembly supporting construction as claimed in claim 2, wherein the auxiliary member is an engine of the vehicle.

4. A steering assembly supporting construction as claimed in claim 2, wherein said releasing means includes a first end to be connected to the auxiliary member and a second end connected to said second steering column supporting member.

5. A steering assembly supporting construction as claimed in claim 1, wherein said releasing means is connected to a weight member operable, upon the occurrence of the collision, to move by inertia and to cause said means to release the connected state of said steering column by the second steering column supporting member.

6. A steering assembly supporting construction as claimed in claim 5, wherein said second steering column supporting member comprises a pair of clamp members supported pivotably at first ends thereof to a member on the vehicle body, and a connecting pin insertable through second ends of said clamp members for clamping said steering column between said clamp members, and said releasing means comprises a moving member moved by movement of said weight member upon the occurrence of the collision to remove said connecting pin from said second ends of said clamp members, thereby to release the connected state of said steering column.

7. A steering assembly supporting construction as claimed in claim 1, wherein said steering shaft comprises a main steering shaft and a connecting shaft for connecting said main steering shaft with a gear box unit, and a joint between said main steering shaft and said connecting shaft and a joint between said connecting shaft and the gear box unit being universal joints.

8. A steering assembly supporting construction as claimed in claim 7, wherein said connecting shaft inclines downwardly with respect to said main steering shaft.

9. A steering assembly supporting construction as claimed in claim 7, wherein the gear box unit includes a gear box and a pinion projecting upwardly from the gear box, and said connecting shaft is connected to an upper end of said pinion rod.

10. A steering assembly supporting construction as claimed in claim 7, wherein said first steering column supporting member extends in the direction of the width of the vehicle and has opposite ends connected to a cowl of the vehicle.

11. A steering assembly supporting construction as claimed in claim 7, wherein said second steering column supporting member connects a bracket connected to a cowl of the vehicle extending in the direction of the width of the vehicle with said steering column.

12. A steering assembly supporting construction as claimed in claim 1, wherein said second steering column supporting member comprises a sliding member mounted slidably at the outer circumference of said steering column, said sliding member including an engaging portion fittable into and removable from a holding member to be fixed on the vehicle body, and said connected state of said steering column is released by removing said engaging portion from said holding member upon sliding of said sliding member relative to said steering column.

13. A steering assembly supporting construction as claimed in claim 12, wherein said releasing means comprises a link member having a first end to be positioned closely adjacent a rearwardly facing surface of an auxiliary member arranged in an engine compartment of the vehicle and a second end contacting said sliding member of said second steering column supporting member, such that said link member moves rearwardly with movement of the auxiliary member upon the occurrence of a collision, and said second end of said link member slides said sliding member to remove said engaging portion from said holding member.

14. A steering assembly supporting construction as claimed in claim 1, wherein said second steering column supporting member comprises a pair of clamp members supported pivotably at first one ends thereof to a member on the vehicle body, and a connecting pin insertable through second ends of said clamp members for clamping said steering column between said clamp members, the connected state of said steering column being released by withdrawal of said connecting pin from said second ends of said clamp member.

15. A steering assembly supporting construction as claimed in claim 14, wherein said releasing means comprises a wire having a first end to be connected rom above to an auxiliary member arranged in an engine compartment of the vehicle and a second end connected to the rear of said connecting pin of said second steering column supporting member, such that, upon the occurrence of a collision, said wire is pulled by the movement of the auxiliary member and removes said connecting pin from said second ends of said clamp members.

16. A steering assembly supporting construction as claimed in claim 1, wherein said second steering column supporting member comprises a connecting rod connected to said steering column and extending the direction of the width of the vehicle and orthogonal to the axis of said steering column, a receiving member to be mounted on the vehicle body and supporting said connecting rod from the underside thereof, and a restricting member to be pivotally mounted on the vehicle body side and urging said connecting rod from the upper side thereof toward said receiving member.

17. A steering assembly supporting construction as claimed in claim 16, wherein said releasing means comprises a link member having a first end to be positioned closely adjacent to a rearwardly facing surface of an auxiliary member arranged in an engine compartment of the vehicle and a second end connected to said restricting member of said second steering column supporting member, such that said link member moves rearwardly with movement of the auxiliary member upon the occurrence of a collision and pivots said restricting member away from said connecting rod to release said connecting rod from said receiving member.

* * * * *